(12) United States Patent
Hikima et al.

(10) Patent No.: US 11,580,981 B2
(45) Date of Patent: Feb. 14, 2023

(54) IN-VEHICLE SPEECH PROCESSING APPARATUS

(71) Applicant: DENSO TEN Limited, Kobe (JP)

(72) Inventors: Katsuaki Hikima, Kobe (JP); Daisuke Yamasaki, Kobe (JP); Futoshi Kosuga, Kobe (JP)

(73) Assignee: DENSO TEN Limited, Kobe (JP)

( * ) Notice: Subject to any disclaimer, the term of this patent is extended or adjusted under 35 U.S.C. 154(b) by 97 days.

(21) Appl. No.: 17/190,835

(22) Filed: Mar. 3, 2021

(65) Prior Publication Data

US 2021/0304752 A1 Sep. 30, 2021

(30) Foreign Application Priority Data

Mar. 27, 2020 (JP) .............................. JP2020-058355

(51) Int. Cl.

| G10L 15/22 | (2006.01) |
|---|---|
| G10L 15/20 | (2006.01) |
| G10L 15/08 | (2006.01) |
| G10L 21/0216 | (2013.01) |
| G10L 21/0208 | (2013.01) |

(52) U.S. Cl.
CPC .............. *G10L 15/22* (2013.01); *G10L 15/08* (2013.01); *G10L 15/20* (2013.01); *G10L 21/0216* (2013.01); *G10L 2015/088* (2013.01); *G10L 2021/02082* (2013.01); *G10L 2021/02163* (2013.01)

(58) Field of Classification Search
CPC ................................. G10L 15/30; G10L 15/22
See application file for complete search history.

(56) References Cited

U.S. PATENT DOCUMENTS

| 8,996,386 | B2* | 3/2015 | Alasry | ..................... G10L 15/06 704/270 |
| 2010/0185434 | A1* | 7/2010 | Burvall | .................. G10L 15/005 704/3 |
| 2014/0357248 | A1* | 12/2014 | Tonshal | ............... H04M 1/6091 455/418 |
| 2015/0199965 | A1* | 7/2015 | Leak | ....................... G10L 15/22 704/249 |
| 2016/0098992 | A1* | 4/2016 | Renard | .................... G10L 15/30 704/275 |
| 2016/0125878 | A1* | 5/2016 | Lim | ......................... G10L 15/22 704/235 |

(Continued)

FOREIGN PATENT DOCUMENTS

| JP | 2019-174778 A | 10/2019 |
| JP | 2019-191554 A | 10/2019 |

*Primary Examiner* — Shaun Roberts
(74) *Attorney, Agent, or Firm* — Oliff PLC

(57) ABSTRACT

An in-vehicle apparatus is connectable to a device that includes a voice assistant function. The in-vehicle apparatus includes: a voice detector that performs voice recognition of an audio signal input from a microphone and that controls functions of the in-vehicle apparatus based on a result of the voice recognition; and an interface that communicates with the device. When being informed of a detection of a predetermined word in the audio signal as the result of the voice recognition of the audio signal performed by the voice detector, the interface sends to the device, not via the voice detector, the audio signal input from the microphone. The predetermined word is for activating the voice assistant function of the device.

10 Claims, 4 Drawing Sheets

(56) References Cited

U.S. PATENT DOCUMENTS

| | | | |
|---|---|---|---|
| 2017/0103756 A1* | 4/2017 | Kobayashi | G10L 15/30 |
| 2017/0136969 A1* | 5/2017 | Drescher | H04N 5/33 |
| 2017/0178663 A1* | 6/2017 | Misawa | G10L 13/00 |
| 2017/0365257 A1* | 12/2017 | Lin | G10L 19/00 |
| 2018/0247645 A1* | 8/2018 | Li | G10L 15/1815 |
| 2018/0350365 A1* | 12/2018 | Lee | G10L 15/22 |
| 2020/0221223 A1* | 7/2020 | Zhou | G10L 15/08 |

\* cited by examiner

IN-VEHICLE SPEECH PROCESSING APPARATUS

BACKGROUND OF THE INVENTION

Field of the Invention

The invention relates to an in-vehicle speech processing apparatus and a speech processing method used in the in-vehicle apparatus.

Description of the Background Art

Conventionally, a voice assistant function has been known. The voice assistant function uses a voice/speech recognition technology, natural language processing, etc. to recognize a content of a speech of a user and then to provide a proper response or to perform proper processing in accordance with a command, an instruction, a desire, etc. of the user. The voice assistant function is installed in a device and an apparatus, such as a smartphone.

Moreover, it is known that a wake-up word is used to activate the voice assistant function. The wake-up word is a predetermined word that activates the voice assistant function before the user speaks the command, the instruction or the desire. Some examples of the wake-up word are "Hello, my computer," "Hi, vehicle," etc. For example, a user says, "Hello, my computer. Tell me a coffee shop near here." When a phrase including the wake-up word is detected, the voice assistant function is activated. Then, the command, the desire, etc. of the user is recognized by an automatic voice recognition technology and then a proper response is provided, or proper processing is performed in accordance with the recognized command, the desire, etc.

A technology has been known that connects, for example, a mobile device to an in-vehicle apparatus so that a user can safely use the mobile device while the user is driving a vehicle. With the technology, the user may use the voice assistant function included in the mobile device via the in-vehicle apparatus connected with the mobile device. When the voice assistant function included in the mobile device is used via the in-vehicle apparatus, it is undesirable that it takes time more than necessary to activate the voice assistant function that is activated by the wake-up word.

SUMMARY OF THE INVENTION

According to one aspect of the invention, an in-vehicle apparatus is connectable to a device that includes a voice assistant function, and the in-vehicle apparatus includes: a voice detector that performs voice recognition of an audio signal input from a microphone and that controls functions of the in-vehicle apparatus based on a result of the voice recognition; and an interface that communicates with the device. When being informed of a detection of a predetermined word in the audio signal as the result of the voice recognition of the audio signal performed by the voice detector, the interface sends to the device, not via the voice detector, the audio signal input from the microphone. The predetermined word is for activating the voice assistant function of the device.

An object of the invention is to provide a technology for quickly activating a voice assistant function activated by a predetermined word for an in-vehicle apparatus connected to a mobile device that includes the voice assistant function.

These and other objects, features, aspects and advantages of the invention will become more apparent from the following detailed description of the invention when taken in conjunction with the accompanying drawings.

DESCRIPTION OF THE EMBODIMENTS

An embodiment of the invention will be described below with reference to the drawings.

<1. Speech Processing System>

Figure 1:
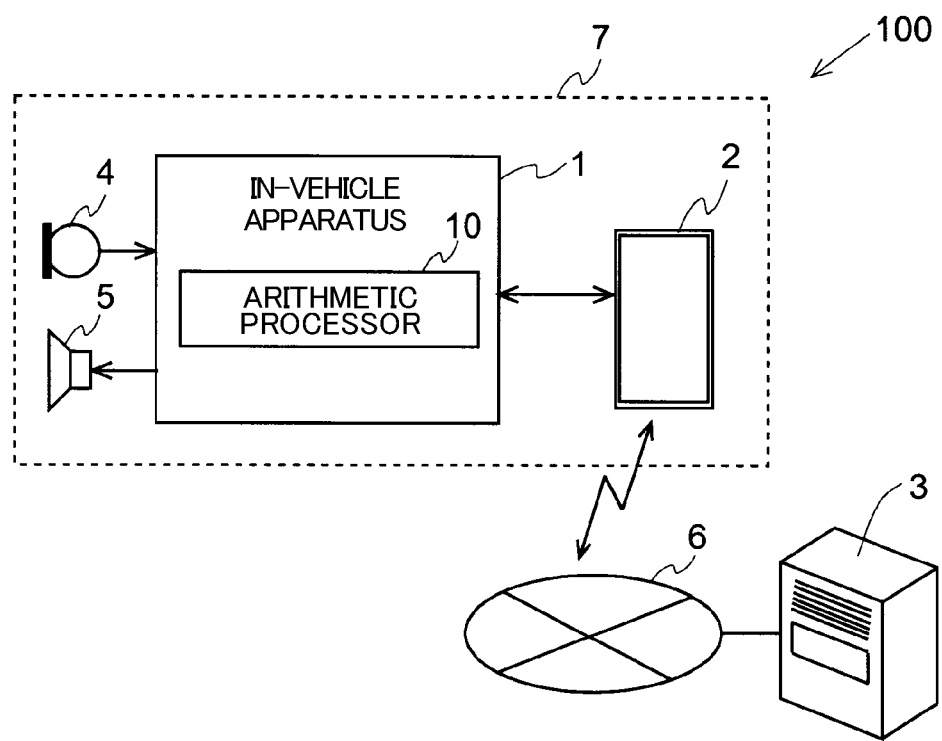
FIG. 1 is a schematic diagram illustrating a configuration of a speech processing system.

FIG. 1 is a schematic diagram illustrating a configuration of a speech processing system 100 of this embodiment of the invention. As illustrated in FIG. 1, the speech processing system 100 mainly includes an in-vehicle apparatus 1, a mobile device 2, and a server 3.

The in-vehicle apparatus 1 is connected to a microphone 4 by wire or wirelessly. A voice of speech, a phrase, a word, etc. (hereinafter referred to collectively as "speech") of a user is input to the in-vehicle apparatus 1 via the microphone 4. The in-vehicle apparatus 1 processes an audio signal input from the microphone 4. Moreover, the in-vehicle apparatus 1 is connected to a loudspeaker 5 by wire or wirelessly. The in-vehicle apparatus 1 processes an audio signal necessary to output sound/voice from the loudspeaker 5. The loudspeaker 5 converts the audio signal input from the in-vehicle apparatus 1 to the sound/voice, and then outputs the sound/voice.

In this embodiment, the microphone 4 and the loudspeaker 5 are separate devices from the in-vehicle apparatus 1. However, the microphone 4 and the loudspeaker 5 may be included in the in-vehicle apparatus 1.

In this embodiment, the in-vehicle apparatus 1 functions as a speech processing apparatus and is installed in a vehicle 7. The microphone 4 and the loudspeaker 5 are also installed in the vehicle 7. Regardless of the term "in-vehicle apparatus," the in-vehicle apparatus 1 may be installed in a movable body other than a vehicle. Some examples of the movable body other than the vehicle are a ship, an airplane, etc. Regardless of the term "in-vehicle apparatus," the in-vehicle apparatus 1 may be provided in a room or the like. The in-vehicle apparatus 1 may be a complex device that includes, for example, an audio function and/or a navigation function in addition to a speech processing function.

The mobile device 2 is connected to the in-vehicle apparatus 1 by wire or wirelessly. In other words, the in-vehicle apparatus 1 is provided to be connectable to the mobile device 2. In this embodiment, the mobile device 2 includes a voice assistant function. The mobile device 2 is, for example, a smartphone or a tablet device. The mobile device 2 is provided to be capable of communicating with the server 3 via a network 6. In this embodiment, the user carries the mobile device 2 into the vehicle 7 and connects the mobile device 2 to the in-vehicle apparatus 1 for use. Since the mobile device 2 is connected to the in-vehicle apparatus 1, the user (driver) can use a function of the mobile device 2 safely with no direct operation with the mobile device 2 while driving the vehicle 7.

The server 3 includes artificial intelligence (AI). The AI analyzes the voice of the speech of the user and performs processing in accordance with a content of the speech. When the voice assistant function of the mobile device 2 is activated, a voice command included in the speech of the user is sent to the server 3 via the network 6. The AI analyzes the command and performs the processing in accordance with the command. Herein, some among the processing performed in accordance with a command are an image search, a video search, a music search and a search of a matter that the user desires to know.

In this embodiment, when a predetermined word is detected in the voice of the speech of the user, the voice assistant function of the mobile device 2 is activated. The predetermined word is a so-called wake-up word. The predetermined word that activates the voice assistant function of the mobile device 2 is referred to hereinafter as "wake-up word." In this embodiment, when the user speaks the wake-up word toward the microphone 4, the voice assistant function of the mobile device 2 is activated by an action of the in-vehicle apparatus 1.

<2. Detailed Configuration of the In-Vehicle Apparatus>

As shown in FIG. 1, the in-vehicle apparatus 1 includes an arithmetic processor (arithmetic processing circuit) 10 that processes the audio signal. The arithmetic processor 10 may be, for example, a computer including a central processing unit (CPU), a random access memory (RAM), a read only memory (ROM), etc.

Figure 2:
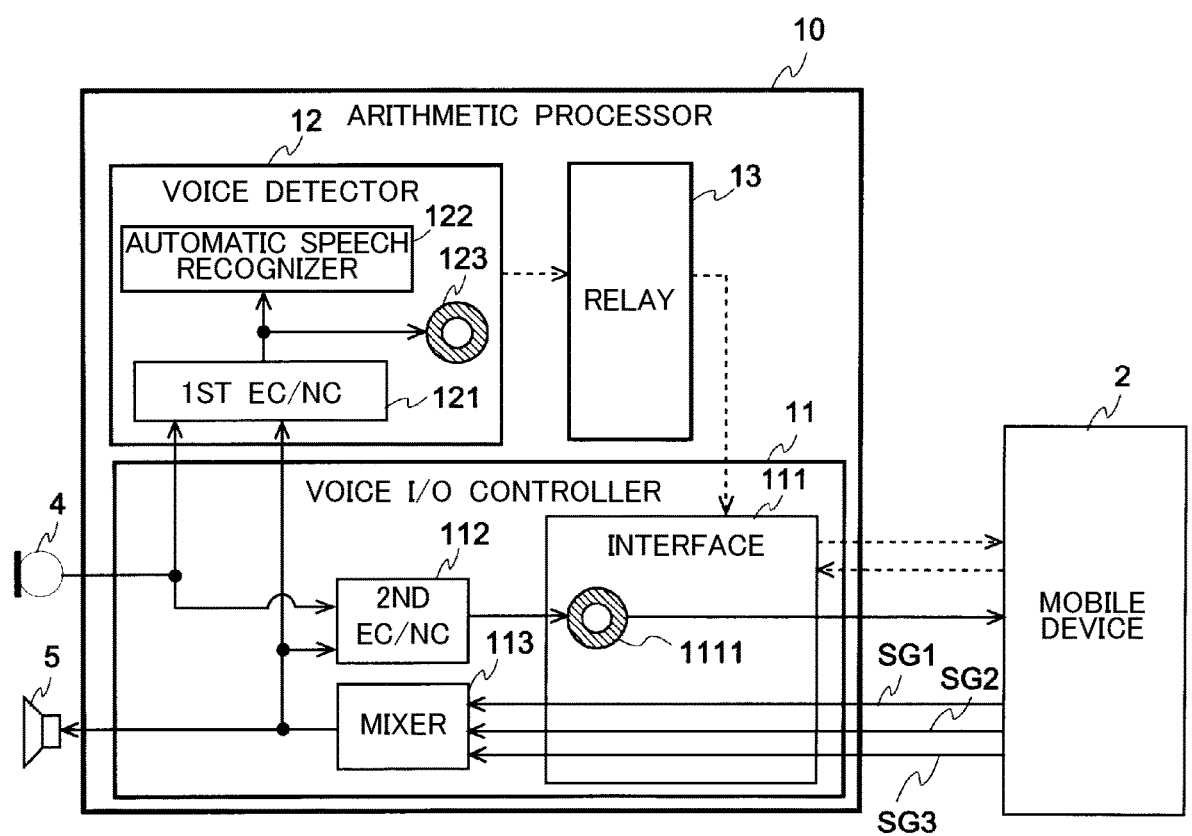
FIG. 2 is a block diagram illustrating a functional configuration of an arithmetic processor.

FIG. 2 is a block diagram illustrating a functional configuration of the arithmetic processor 10 of this embodiment. In FIG. 2, a solid arrow shows a flow of the audio signal and a dashed arrow shows a flow of the command. Blocks in FIG. 2 are functions that are performed by the arithmetic processing of the CPU included in the computer, based on programs stored in a memory.

As shown in FIG. 2, the arithmetic processor 10 includes a voice input/output controller 11, a voice detector 12, and a relay 13. In other words, the in-vehicle apparatus 1 includes the voice input/output controller 11, the voice detector 12, and the relay 13.

The voice input/output controller 11 controls an input and an output of the audio signals. The voice input/output controller 11 controls the audio signal input from the microphone 4. The voice input/output controller 11 controls the audio signal to be output from the loudspeaker 5. The voice input/output controller 11 includes, for example, a sound driver such as Advanced Linux (registered trademark) Sound Architecture (ALSA).

The voice input/output controller 11 further includes an interface 111. In other words, the in-vehicle apparatus 1 includes the interface 111. The voice input/output controller 11 is connectable to the mobile device 2 via the interface 111. The interface 111 communicates with the mobile device 2. In this embodiment, the interface 111 is interface software for a predetermined application software in the mobile device 2. Details of the interface 111 will be described later.

The audio signal is input to the voice detector 12 from the microphone 4. More specifically, the audio signal is input to the voice detector 12 from the microphone 4 via the voice input/output controller 11. The voice detector 12 performs voice recognition of the audio signal input from the microphone 4, and controls functions of the in-vehicle apparatus 1 based on a result of the voice recognition. The voice detector 12 detects the wake-up word (the predetermined word) that activates the voice assistant function of the mobile device 2. More specifically, when the wake-up word is included in the voice input from the microphone 4, the voice detector 12 detects the wake-up word.

The voice detector 12 may only detect the wake-up word that activates the voice assistant function of the mobile device 2. However, the voice detector 12 may be capable of detecting other words. For example, the voice detector 12 may also detect a wake-up word for a voice assistant function of the in-vehicle apparatus, different from the voice assistant function of the mobile device 2, in addition to the wake-up word for the voice assistant function of the mobile device 2.

As shown in FIG. 2, more specifically, the voice detector 12 includes a first echo canceller and a noise canceller 121, an automatic speech recognizer 122, and a voice detector buffer 123. The "echo canceller and noise canceller" are hereinafter referred to as "EC/NC" for simple explanation.

The audio signal is input from the microphone 4 to the first EC/NC 121. The first EC/NC 121 perform an echo cancellation and a noise cancellation of the input audio signal. Then, the first EC/NC 121 output the audio signal after the cancellations. More specifically, in addition to the audio signal input from the microphone 4, the audio signal to be output to the loudspeaker 5 is input to the first EC/NC 121 for the echo cancellation. Moreover, road noise that is caused by travelling of the vehicle 7 is removed by the first EC/NC 121 by use of a known method, such as spectral subtraction method (SS method).

The audio signal that went through the first EC/NC 121 is input to the automatic speech recognizer 122. The automatic speech recognizer 122 is configured to convert the audio signal into a text to recognize the predetermined word included in the voice. In other words, the automatic speech recognizer 122 is configured to recognize the wake-up word (the predetermined word). In other words, the automatic speech recognizer 122 recognizes and detects the wake-up word.

The voice detector buffer 123 temporarily stores the audio signal that went through the first EC/NC 121. The audio signal temporarily stored in the voice detector buffer 123 may be sent to, for example, the in-vehicle apparatus in a case in which the in-vehicle apparatus includes a voice assistant function different from the voice assistant function of the mobile device 2.

The relay 13 is a software interface. When the wake-up word is detected by the voice detector 12, the relay 13 is informed of a detection of the wake-up word. When being informed of the detection of the wake-up word, the relay 13 informs the interface 111 of the detection of the wake-up word.

When the wake-up word is detected, the interface 111 is informed of the detection of the wake-up word. The interface 111 informs the mobile device 2 of the detection of the wake-up word. In other words, when the voice detector 12 detects that the wake-up word is included in the audio signal, the voice detector 12 informs the mobile device 2, via the interface 111, of the detection of the wake-up word. When being informed of the detection of the wake-up word, the mobile device 2 requests the audio signal to activate the voice assistant function.

As a result of the voice recognition of the audio signal by the voice detector 12, when being informed that the wake-up word is included in the audio signal, the interface 111 sends to the mobile device 2, not via the voice detector 12, the audio signal input from the microphone 4. More specifically, at a request of the mobile device 2 that has been informed of the detection of the wake-up word, the interface 111 sends to the mobile device 2, not via the voice detector 12, the audio signal input from the microphone 4. The interface 111 may be configured to send the audio signal input from the microphone 4 in accordance with internal processing of the in-vehicle apparatus 1 rather than at the request of the mobile device 2, to the mobile device 2, not via the voice detector 12. Moreover, the interface 111 includes an interface buffer 1111 that temporarily stores the audio signal input from the microphone 4. When being informed of the detection of the wake-up word, the interface 111 sends the audio signal stored in the interface buffer 1111 to the mobile device 2.

In this embodiment, the voice input/output controller 11 further includes second EC/NC 112 different from the first EC/NC 121 included in the voice detector 12. In other words, the in-vehicle apparatus 1 further includes the second EC/NC 112 that is different from the first EC/NC 121 included in the voice detector 12. The audio signal is input from the microphone 4 to the second EC/NC 112. The second EC/NC 112 perform an echo cancellation and a noise cancellation of the input audio signal. After the cancellations, the second EC/NC 112 output the audio signal. Methods that are used by the second EC/NC 112 for the echo cancellation and the noise cancellation are same as methods that are used by the first EC/NC 121.

The audio signal input from the microphone 4 is input to the interface 111 via the second EC/NC 112. Thus, quality of the audio signal sent from the interface 111 to the mobile device 2 is improved. Therefore, accurate voice recognition can be performed in the mobile device 2.

In this embodiment, the voice input/output controller 11 further includes a mixer 113. The mixer 113 is provided because a plurality of sorts of the audio signals are output from the mobile device 2. Since the mixer 113 is provided, the plurality of sorts of the audio signals output from the mobile device 2 can be output to the loudspeaker 5 together. In this embodiment, the audio signals output from the mixer 113 are sent to the first EC/NC 121 and the second EC/NC 112 for the echo cancellations, in addition to the loudspeaker 5.

A main signal SG1, a first interrupt signal SG2, and a second interrupt signal SG3 are included in the plurality of sorts of the audio signals. The main signal SG1 is a signal, for example, for music reproduction. The first interrupt signal SG2 is an audio signal, for example, for a navigation system. The second interrupt signal SG3 is an audio signal, for example, for the voice assistant function.

<3. Action Effect of the In-Vehicle Apparatus>

Figure 3:
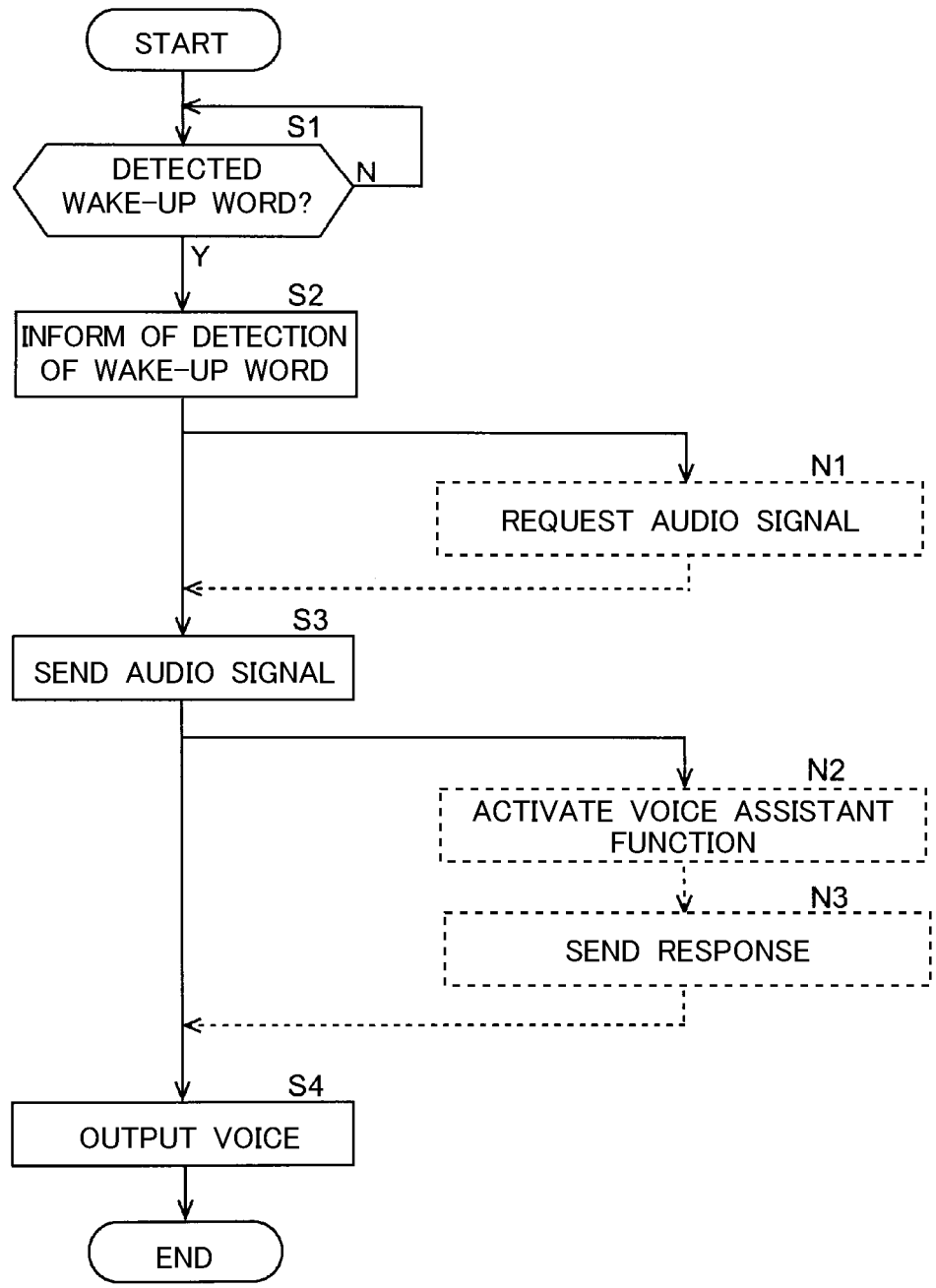
FIG. 3 is a flowchart exemplifying process steps performed when a voice assistant function of a mobile device is used via an in-vehicle apparatus.

FIG. 3 is a flowchart exemplifying process steps that is performed when the voice assistant function of the mobile device 2 is used via the in-vehicle apparatus 1 of this embodiment. In FIG. 3, a solid line shows a process that is performed by the in-vehicle apparatus 1, and a dashed line shows a process that is performed by the mobile device 2.

In a step S1, a detection of the wake-up word by the voice detector 12 of the in-vehicle apparatus 1 is monitored. The step S1 includes a step that sends, to the voice detector 12 and the interface 111, the audio signal input to the in-vehicle apparatus 1 from the microphone 4. The voice detector 12 detects whether the wake-up word is included in the audio signal sent to the voice detector 12. When the wake-up word is detected by the voice detector 12 (Yes in the step S1), the flow moves to a next step S2.

When the wake-up word is by the voice detector 12, the mobile device 2 is informed, via the interface 111, of the detection of the wake-up word in the step S2. More specifically, since the detection of the wake-up word by the voice detector 12 functions as a trigger, the interface 111 is informed, via the relay 13, of the detection of the wake-up word. The informed interface 111 informs the mobile device 2 of the detection of the wake-up word. When being informed of the detection of wake-up word, the mobile device 2 performs a step N1.

In the step N1, the mobile device 2 requests the in-vehicle apparatus 1 to send the audio signal. The mobile device 2 requests the in-vehicle apparatus 1 to send the audio signal indicative of a content of a user speech including the wake-up word. More specifically, the mobile device 2 sends, to the interface 111, a time stamp of a time point at which the mobile device 2 was informed of the detection of the wake-up word. When receiving the time stamp, the interface 111 performs a step S3.

In the step S3, at the request of the mobile device 2 that has been informed of the detection of the wake-up word, the interface 111 sends, to the mobile device 2, the audio signal sent from the microphone 4 to the interface 111. The audio signal sent from the microphone 4 to the interface 111 is input to the interface 111 not via the voice detector 12.

More specifically, the audio signal is input to the interface 111 from the microphone 4 via the second EC/NC 112. The interface 111 temporarily stores, in the interface buffer 1111, the audio signal input via the second EC/NC 112. The interface 111 sends, to the mobile device 2, at least one of the audio signals stored in the interface buffer 1111. The at least one audio signal to be sent to the mobile device 2 is the audio signal that has been stored in the interface buffer 1111 from a time point A that is earlier than the time stamp and is determined based on the time stamp. In other words, the interface 111 sends, to the mobile device 2, the audio signal that has been stored in the interface buffer 1111 on and after the time point A that is determined by going back a predetermined time period from the time point at which the mobile device 2 has been informed of the detection of the wake-up word (herein, the time stamp). When receiving the audio signal, the mobile device 2 performs a step N2.

In the step N2, after receiving the audio signal, the mobile device 2 detects the wake-up word, and then the voice assistant function is activated. When the voice assistant function is activated, the mobile device 2 sends, to the server 3, the audio signal that the mobile device 2 has received from the in-vehicle apparatus 1. In the server 3, speech analysis is performed based on the audio signal and processing in accordance with a content of the speech is performed by use of AI. The server 3 sends a result of the processing to the mobile device 2. When receiving the result of the processing from the server 3, the mobile device 2 performs a next step N3.

In the step N3, the mobile device 2 sends, to the in-vehicle apparatus 1, a response (an audio signal) in accordance with the result of the processing performed in the server 3. The in-vehicle apparatus 1 receives the response and then performs a step S4.

In the step S4, the response sent from the mobile device 2 is output from the loudspeaker 5 under a control of the voice input/output controller 11. Then, the flow of the voice assistant function of the mobile device 2 via the in-vehicle apparatus 1 ends.

In this embodiment, the audio signal input to the in-vehicle apparatus 1 from the microphone 4 is sent to both the voice detector 12 and the interface 111. In other words, in this embodiment, the audio signal is input from the microphone 4 to the interface buffer 1111 of the interface 111 to be stored, without going through the voice detector 12. Thus, the audio signal can be quickly sent at the request of the mobile device 2 for the audio signal.

Figure 4:
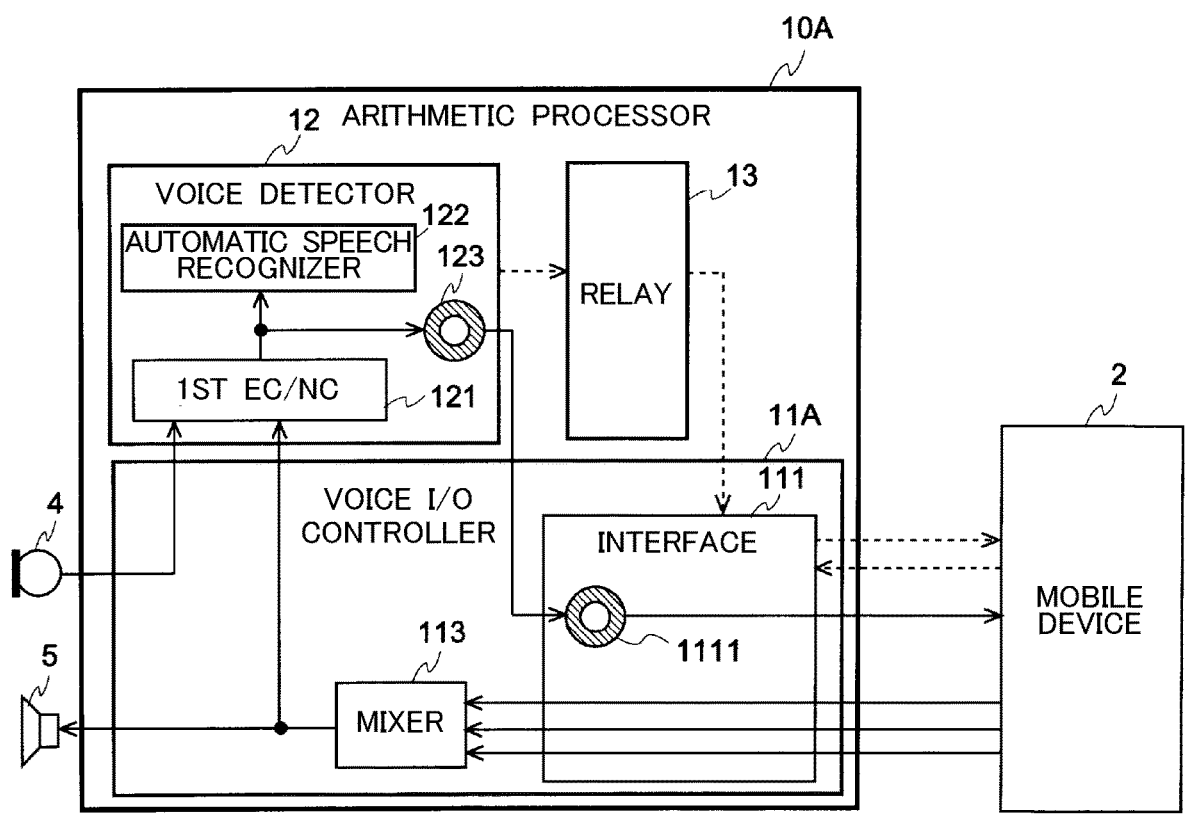
FIG. 4 illustrates the comparison example to explain an effect of the in-vehicle apparatus of this embodiment.

The quick sending of the audio signal will be described below with reference to a comparison example in FIG. 4. FIG. 4 illustrates the comparison example to explain an effect of the in-vehicle apparatus 1 of this embodiment. FIG. 4 shows an arithmetic processor 10A of the comparison example.

It is preferable that the audio signal input from the microphone 4 to the voice detector 12 and the interface 111 should go through the EC/NC. Thus, as shown in FIG. 4, the audio signal temporarily stored in the voice detector buffer 123 after going through the first EC/NC 121 may be sent to the interface buffer 1111 of the interface 111. As a result, the voice input/output controller 11A is configured without the second EC/NC 112. In other words, it is possible to reduce number of ECs/NCs.

However, in a case of a configuration shown in FIG. 4, the audio signal input from the microphone 4 needs to go through the voice detector buffer 123 included in the voice detector 12 to reach the interface 111. Since it takes approximately 10 ms to go through the voice detector buffer 123, when the mobile device 2 requests the interface 111 to send the audio signal, the audio signal may have not reached the interface buffer 1111 yet.

Meanwhile, in the in-vehicle apparatus 1 of this embodiment, the second EC/NC 112 are provided in the voice input/output controller 11 in which the interface 111 is provided. Thus, the voice can be input to the interface 111 from the microphone 4 without going through the buffer. Therefore, when the mobile device 2 requests the interface 111 to send the audio signal, there is a low possibility that the audio signal have not reached the interface buffer 1111 yet. In other words, the configuration of this embodiment enables the voice assistant function of the mobile device 2 to be activated more quickly.

In this embodiment, the in-vehicle apparatus 1 provides the user with a handsfree talk function by use of the mobile device 2. In such a case, it is preferable that the audio signal input from the microphone 4 should be sent to the mobile device 2 via EC/NC for clearer speech voice of the user.

Therefore, in this embodiment, as a preferable configuration, the second EC/NC 112 also function as the EC/NC for the handsfree talk by use of the mobile device 2. Thus, in this embodiment, a plurality of the functions can be performed without increasing circuits and software more than necessary. In this embodiment, the voice assistant function cannot be used during the handsfree talk.

As described above, at the request of the mobile device 2 that has been informed of the detection of the wake-up word, the interface 111 sends, to the mobile device 2, at least one of the audio signals sent from the microphone 4 and then stored in the interface buffer 1111. However, once being informed of the detection of the wake-up word from the voice detector 12, the interface 111 may send, to the mobile device 2, at least one of the audio signals sent from the microphone 4 and then stored in the interface buffer 1111. In such a case, the interface 111 sends, to the mobile device 2, the at least one audio signal that has been stored in the interface buffer 1111 on and after a time point that is determined by going back a predetermined time period from a time point at which the interface 111 was informed of the detection of the wake-up word.

<4. Notes>

In addition to the details described above, the technical features described in this specification may be changed in various ways without departing from the technical purpose of the invention. In other words, the foregoing embodiment is illustrative, and the invention is not limited to the foregoing embodiment. A scope of the invention is not limited to the foregoing embodiment but is defined by claims. The scope of the invention should include the claims, equivalents thereof, and all changes and/or modifications deemed as the equivalents. Moreover, one of the embodiments disclosed in the specification may be appropriately combined with one or more of the modifications disclosed in the specification.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle apparatus that is connectable to a mobile device that includes a voice assistant function, the in-vehicle apparatus comprising:
    a voice detector that performs voice recognition of an audio signal input from a microphone and that controls functions of the in-vehicle apparatus based on a result of the voice recognition; and
    an interface that communicates with the mobile device, wherein
    the voice detector and the interface are coupled to the microphone so that the audio signal input from the microphone (i) is supplied to the voice detector without passing through the interface and (ii) is supplied to the interface without passing through the voice detector, and
    when the interface is informed of a detection of a predetermined wake-up expression for the mobile device that is present in the audio signal as the result of the voice recognition of the audio signal performed by the voice detector, the interface sends to the mobile device, the audio signal input to the interface from the microphone without passing through the voice detector, the predetermined wake-up expression activating the voice assistant function of the mobile device.

2. The in-vehicle apparatus according to claim 1, wherein the interface includes an interface buffer that temporarily stores the audio signal input from the microphone, and when being informed of the detection of the predetermined wake-up expression, the interface sends the audio signal stored in the interface buffer to the mobile device.

3. The in-vehicle apparatus according to claim 2, wherein the interface sends, to the mobile device, at least one audio signal among the audio signals stored in the interface buffer, the at least one audio signal being stored in the interface buffer on and after a first time point that is determined by going back a predetermined time period from a second time point at which the interface was informed of the detection of the predetermined wake-up expression.

4. The in-vehicle apparatus according to claim 1, wherein when detecting the predetermined wake-up expression, the voice detector informs the mobile device of the detection of the predetermined wake-up expression via the interface, and at a request of the mobile device that has been informed of the detection of the predetermined wake-up expression, the interface sends, to the mobile device, not via the voice detector, the audio signal input from the microphone.

5. The in-vehicle apparatus according to claim 4, wherein the interface includes an interface buffer that temporarily stores the audio signal input from the microphone, and the interface sends, at the request of the mobile device that has been informed of the detection of the predetermined wake-up expression, the audio signal stored in the interface buffer to the mobile device.

6. The in-vehicle apparatus according to claim 5, wherein the interface sends, to the mobile device, at least one audio signal among the audio signals stored in the interface buffer, the at least one audio signal being stored in the interface buffer on and after a first time point that is determined by going back a predetermined time period from a third time point at which the mobile device was informed of the detection of the predetermined wake-up expression.

7. The in-vehicle apparatus according to claim 1, further comprising:
a first echo canceller and a first noise canceller that are included in the voice detector; and
a second echo canceller and a second noise canceller different from the first echo canceller and the first noise canceller, wherein
the audio signal is input from the microphone to the interface via the second echo canceller and the second noise canceller.

8. The in-vehicle apparatus according to claim 7, wherein the second echo canceller and the second noise canceller also function as an echo canceller and a noise canceller that are used for handsfree talk by use of the mobile device.

9. The in-vehicle apparatus according to claim 1, wherein the voice detector includes:
a first echo canceller and a first noise canceller to which the audio signal is input from the microphone;
an automatic speech recognizer that i) receives the audio signal that went through the first echo canceller and the first noise canceller, and ii) recognizes the predetermined wake-up expression; and
a voice detector buffer that temporarily stores the audio signal that went through the first echo canceller and the first noise canceller.

10. A speech processing method in an in-vehicle apparatus that is connectable to a mobile device that includes a voice assistant function, the in-vehicle apparatus comprising:
a voice detector that performs voice recognition of an audio signal input from a microphone and that controls functions of the in-vehicle apparatus based on a result of the voice recognition; and
an interface that communicates with the mobile device,
the voice detector and the interface being coupled to the microphone so that the audio signal input from the microphone (i) is supplied to the voice detector without passing through the interface and (ii) is supplied to the interface without passing through the voice detector, wherein
the speech processing method includes the steps of:
i) sending, to the voice detector, the audio signal input from the microphone, the audio signal that is sent to the voice detector not having passed through the interface;
ii) when a predetermined wake-up expression for activating the voice assistant function of the mobile device is detected by the voice detector, informing the interface of a detection of the predetermined wake-up expression; and
iii) the interface sending to the mobile device, the audio signal having the predetermined wake-up expression input to the interface from the microphone without passing through the voice detector, based on the detection of the predetermined wake-up expression by the voice detector.

\* \* \* \* \*